US010257181B1

(12) United States Patent
Sherif et al.

(10) Patent No.: US 10,257,181 B1
(45) Date of Patent: Apr. 9, 2019

(54) METHODS AND PROCESSES FOR UTILIZING INFORMATION COLLECTED FOR ENHANCED VERIFICATION

(71) Applicant: Capital One Services, LLC, McLean, VA (US)

(72) Inventors: Timur Sherif, Washington, DC (US); Benjamin Lindquist, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/972,697

(22) Filed: May 7, 2018

(51) Int. Cl.
- *H04L 29/06* (2006.01)
- *G06F 21/45* (2013.01)
- *G06N 3/04* (2006.01)
- *G06N 3/08* (2006.01)

(52) U.S. Cl.
CPC ............ *H04L 63/08* (2013.01); *G06F 21/45* (2013.01); *G06N 3/0427* (2013.01); *G06N 3/08* (2013.01); *H04L 63/083* (2013.01); *H04L 63/0861* (2013.01); *H04L 63/0876* (2013.01)

(58) Field of Classification Search
None
See application file for complete search history.

(56) References Cited

U.S. PATENT DOCUMENTS

| 7,206,938 | B2 | 4/2007 | Bender et al. | |
|---|---|---|---|---|
| 2002/0188854 | A1* | 12/2002 | Heaven | G06F 21/10 |
| | | | | 713/186 |
| 2005/0005094 | A1* | 1/2005 | Jamieson | H04L 63/0807 |
| | | | | 713/155 |
| 2007/0136582 | A1 | 6/2007 | Longobardi et al. | |
| 2008/0120507 | A1 | 5/2008 | Shakkarwar | |
| 2010/0049987 | A1 | 2/2010 | Ettorre et al. | |
| 2010/0293094 | A1* | 11/2010 | Kolkowitz | G06Q 20/40 |
| | | | | 705/44 |
| 2011/0035788 | A1 | 2/2011 | White et al. | |
| 2016/0094529 | A1* | 3/2016 | Mityagin | H04L 63/1416 |
| | | | | 726/7 |
| 2017/0085587 | A1 | 3/2017 | Turgeman | |
| 2017/0116405 | A1* | 4/2017 | Samzelius | G06F 3/023 |

* cited by examiner

*Primary Examiner* — William J. Goodchild
(74) *Attorney, Agent, or Firm* — Finnegan, Henderson, Farabow, Garrett & Dunner, LLP

(57) ABSTRACT

A system for verifying a user identity is disclosed. The system is configured to generate a first profile related to the user and receive an indication that the account is accessed by an accessor through an accessor device. The system receives, from the accessor device, identity data associated with the accessor. The system is configured to store the identity data subsets in clusters, analyze the clusters, and output the cluster analyses to node instances that weighs the cluster analyses outputs. The system also generates a second profile related to the accessor based on the received identity data and weighted cluster analysis. The system determines a likelihood factor that the accessor is the user based on a comparison of the first profile and the second profile.

20 Claims, 8 Drawing Sheets

METHODS AND PROCESSES FOR UTILIZING INFORMATION COLLECTED FOR ENHANCED VERIFICATION

TECHNICAL FIELD

The present disclosure generally relates to a system for verifying identity for access to a user account.

BACKGROUND

Reliably and seamlessly verifying an accessor identity in granting access to user accounts is a burdensome task for users.

In general, a system may utilize three factors in verifying a user. The system may verify a user by (1) confirming accurate use of a username/password, (2) confirming user account access by a known device, and (3) confirming user identity through enhanced data such as biometric data. However, a user's own tendencies may limit the system's verification process. For instance, the user may use a weak or compromised username/password, because either it is leaked on the Darkweb, is the same username/password as every other account of the user, or lacks significant encryption. Likewise, the user may have failed to setup known devices, so that the system is unaware of appropriate access by certain devices. Moreover, biometric verification may not be available given the device sensor capabilities. Additionally, users often find that use of any or all of these security procedures is so burdensome that access to the user's account (whether that account is provided by a financial service provider, merchant, a social application, etc.) becomes unacceptably inconvenient. The bottom line is that enhanced security may prevent utilization of the user account for its intended purpose.

Moreover, while some solutions exist for verifying the identity of an entity attempting to access a user account, such solutions may be plagued by the difficulties addressed above. Also, such solutions are inefficient, and do not appropriately collect and utilize data. For instance, there exists a plethora of data available for an identity verification system that current systems do not currently utilize. Every attempt by an accessor generates multiple data points, both active and passive, both from the accessors themselves or from the accessing devices. However, the majority of this data goes unused. For example, in order to counter a user's lack of diligence in setting up known devices, a system could analyze passive device information from devices already successfully accessing the user account, such as the device operating system, model number, process chipsets, browser type, etc. Likewise, the system could utilize user information such as their active error rate, mouse speed, scroll speed, typing speed, eye movement rate, etc. Additionally, users also have static, or passive, data, such as biometric (fingerprints, iris scans, palm vein pulse, heartbeat, etc.) data. All of this data could be implemented in a system to provide a seamless verification system that is constantly collecting data and constantly analyzing the user's access to their account.

The present disclosure provides systems and devices to solve these and other problems.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a processor bracket and, it is to be understood that the disclosed embodiments are not limited to any particular industry.

Disclosed embodiments include a system for verifying a user identity. The system comprises one or more memory devices storing instructions and one or more processors configured to execute the instructions. The processors are configured to receive information associated with an account of a user. The processors are further configured to generate a first profile, where the first profile being related to the user. The processors also receives an indication that the account is accessed by an accessor through an accessor device; and receive, from the accessor device, identity data comprising a plurality of data subsets associated with the accessor. The processors are configured to store the data subsets in respective clusters. The processors are further configured generate cluster analyses by analyzing the data subsets in respective clusters; and output the cluster analyses to node instances that weighs the cluster analyses outputs. The processors also generate a second profile, the second profile related to the accessor and being based on the received identity data and weighted cluster analysis. And the processors are configured to determine a likelihood factor that the accessor is the user based on a comparison of the first profile and the second profile.

It is to be understood that both the foregoing general description and the following detailed description are exemplary and explanatory only, and are not restrictive of the disclosed embodiments, as claimed.

BRIEF DESCRIPTION OF DRAWINGS

The accompanying drawings, which are incorporated in and constitute a part of the specification, illustrate several embodiments and, together with the description, serve to explain the disclosed principles. In the drawings.

DETAILED DESCRIPTION

Figure 1:
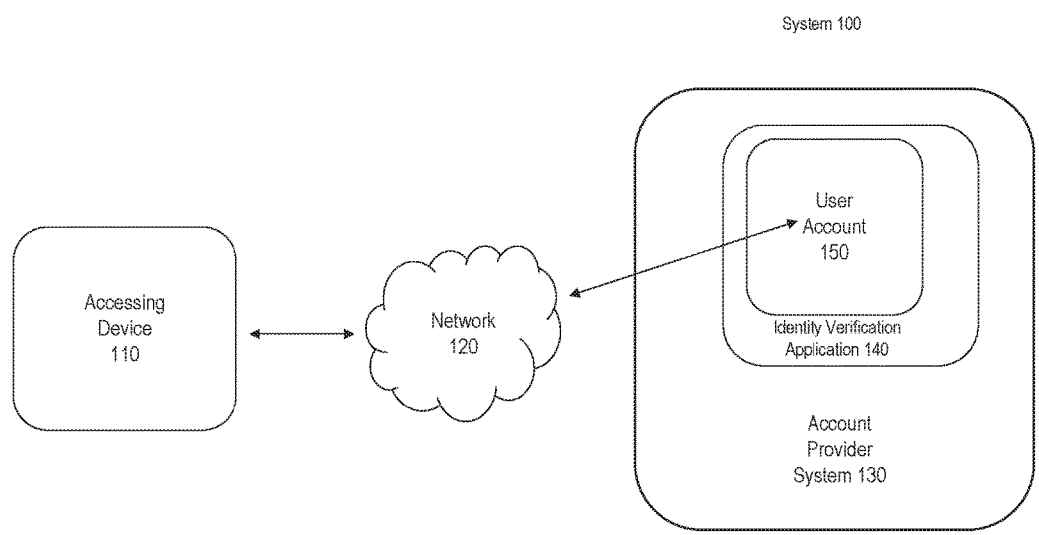
FIG. 1 is a block diagram of an exemplary remote access system, consistent with disclosed embodiments.

An initial overview of machine learning is first provided immediately below and then specific exemplary embodiments of systems and methods for verifying a user identity are described in further detail. The initial overview is intended to aid in understanding some of the technology relevant to the systems and methods disclosed herein, but it is not intended to limit the scope of the claimed subject matter.

In the world of machine prediction, there are two subfields—knowledge-based systems and machine learning systems. Knowledge-based approaches rely on the creation of a heuristic or rule-base which is then systematically applied to a particular problem or dataset. Knowledge-based systems make inferences or decisions based on an explicit "if-then" rule system. Such systems rely on extracting a high degree of knowledge about a limited category in order to virtually render all possible solutions to a given problem. These solutions are then written as a series of instructions to be sequentially followed by a machine.

Machine learning, unlike the knowledge-based programming, provides machines with the ability to learn through data input without being explicitly programmed with rules. For example, as just discussed, conventional knowledge-based programming relies on manually writing algorithms (i.e. rules) and programming instructions to sequentially execute the algorithms. Machine learning systems, on the other hand, avoid following strict sequential programming instructions by making data-driven decisions to construct their own rules. The nature of machine learning is the iterative process of using rules, and creating new ones, to identify unknown relationships to better generalize and handle non-linear problems with incomplete input data sets.

Examples of machine learning techniques include, but are not limited to decision tree learning, association rule learning, inductive logic programming, support vector machines, clustering, Bayesian networking, reinforcement learning, representation learning, similarity and metric learning, spare dictionary learning, rule-based machine learning, and artificial neural networks.

One such machine learning technique involves the use of "artificial neural networks." Artificial neural networks are computational systems that enable computers to essentially function in a manner analogous to that of the human brain. Generally, a neural network is an information-processing network and an artificial neural network is an information-processing network inspired by biological neural systems. Artificial neural networks create non-linear connections between computation elements (i.e., "nodes" and "clusters") operating in parallel and arranged in patterns. The nodes are connected via variable weights, typically adopted during use, to improve performance. Thus, in solving a problem or making a prediction, an artificial neural network model can explore many hypotheses and permutations by simultaneously using massively parallel networks composed of many computational elements connected by links with variable weights.

The function of the artificial neural network is determined by the network structure, connection strengths, and the processing performed at the computation elements. The nodes can be "neuron-like" computational elements that output a signal based on the sum of their inputs, the output being the result of an activation function. Much like a biological neural network, an artificial neural network thus has a plurality of computation elements interconnected with weighted communication bridges. By adjusting the weight values of the connections between computation elements in a network, one can match certain inputs with desired outputs. The respective weights assigned to particular computation elements are dynamic and can be modified in response to training. Through this weighted connection structure, the network "communicates," identifies unknown relationships, and "learns" the characteristics of general input categories. Thus artificial neural networks do not require pre-programming that anticipates all possible variants of the input data they receive.

As already discussed, a neural network is not programmed; instead, it is "taught." Of course, there are many variations for teaching an artificial neural network. Some networks are taught through examples; whereas others extract information directly from the input data. The two variations are called "supervised" and "unsupervised" learning. In supervised systems, a learning algorithm is incorporated to adjust the weights of the connections in the network for optimal performance, based on the presentation of a predetermined set of correct stimulus-response pairs. Rather than attempting to anticipate every possible exhibition of data, artificial neural networks attempt to recognize patterns of data and make decisions based on the conformity with historical patterns having known attributes. The training of neural networks involves an iterative process where individual weights between nodes are repeatedly adjusted until the system converges to produce a derived output. While training a neural network may be time consuming, it is not labor intensive and avoids the necessity to develop an explicit algorithm. In essence, after training, the architecture of the neural network embodies the algorithm. The techniques and algorithms for training neural networks are numerous and diverse, each having certain advantages and disadvantages.

In contrast to supervised systems, unsupervised systems require no historical training data to train the system. The artificial neural network is autonomous and as such it can automatically determine properties about data and reflect these properties in an output. Unsupervised neural networks take into consideration not only the properties of individual events producing data, but the event's relationship with other events and the event's relationship to predetermined concepts which characterize the event collection. One unsupervised learning technique, conjunctive conceptual clustering, was first developed in the early eighties by Stepp and Michalski. A detailed explanation of the technique is disclosed in their article; Michalski, R. S., Stepp, R. E. "Learning from Observation: Conceptual Clustering", Chapter 11 of Machine Learning: an Artificial Intelligence Approach, eds. R. S. Michalski, J. G. Carbonell and T. M. Mitchell, San Mateo: Morgan Kaufmann, 1983.

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments relate to systems and methods for utilizing enhanced data to verify an user account accessor's identity. While some solutions currently exist for verifying identities, such solutions typically only implement user-defined security. This is inefficient and relies on a user to actively provide secure access to the account. Furthermore, current solutions do not effectively utilize machine learning to properly analyze user accessing behavior, or model accessing behavior.

There exist substantial untapped user data sources that can be utilized to provide improved seamless user verification. One such area is to tap into every instance of the user accessing his account and to farm the active and passive data sets generated by such user accesses. Every user access attempt generates multiple active and passive data points, both from himself and from the accessing device; however, the majority of these data points go unused. For example, in order to counter the user's lack of diligence in setting up known devices, a system could analyze passive information from those devices used by the user to successfully access the user account. Such passive device information may include the device operating system, model number, process chipsets, browser type, etc. Likewise, the system could utilize user information such as the user's active error rate, mouse speed, scroll speed, typing speed, eye movement rate, etc. Additionally, users also have static, or passive data, such as fingerprints, iris scans, palm vein pulse, heartbeat, and other biometric data. This static data could be implemented in a system to provide a seamless verification system that is constantly collecting data and constantly analyzing the user's access to their account.

The following description provides examples of systems and methods for verifying the identity of a user. The arrangement of components shown in the figures is not intended to limit the disclosed embodiments, as the components used in the disclosed systems may vary.

FIG. 1 depicts an illustrative remote access system 100 utilizing information collected for enhanced user identity verification in accordance with aspects of an embodiment of the present disclosure. System 100 includes an accessing device 110, which can be any user device discussed above, in communication with a network 120 which is in further communication with an account provider system 130. The means of communication between device 110, network 120, system 130 can vary and the particular combination can also vary, such that device 110 may communicate directly with system 130 and vice versa. It will also be understood that device 110, and devices associated with system 130, may also communicate directly with network 120 or through network 120. Account provider system 130 also contains devices that store, or are associated with, identity verification application 140 and user account 150.

Through these illustrative components, system 100 collects and utilizes data for enhanced user identity verification. For instance, by collecting passive and active data from a user, or account accessor, and data from accessing device 110, account provider system 130 can further verify that an access attempt to user account 150 is authorized, by verifying the accessor identity with identity verification application 140. Account provider system 130 may further use collected and analyzed data to continuously update historical records of the user and verify the user identity based on the passive, active, and behavioral data. In turn, the account provider system 130 may provide a more seamless and secure account access experience.

Figure 2:
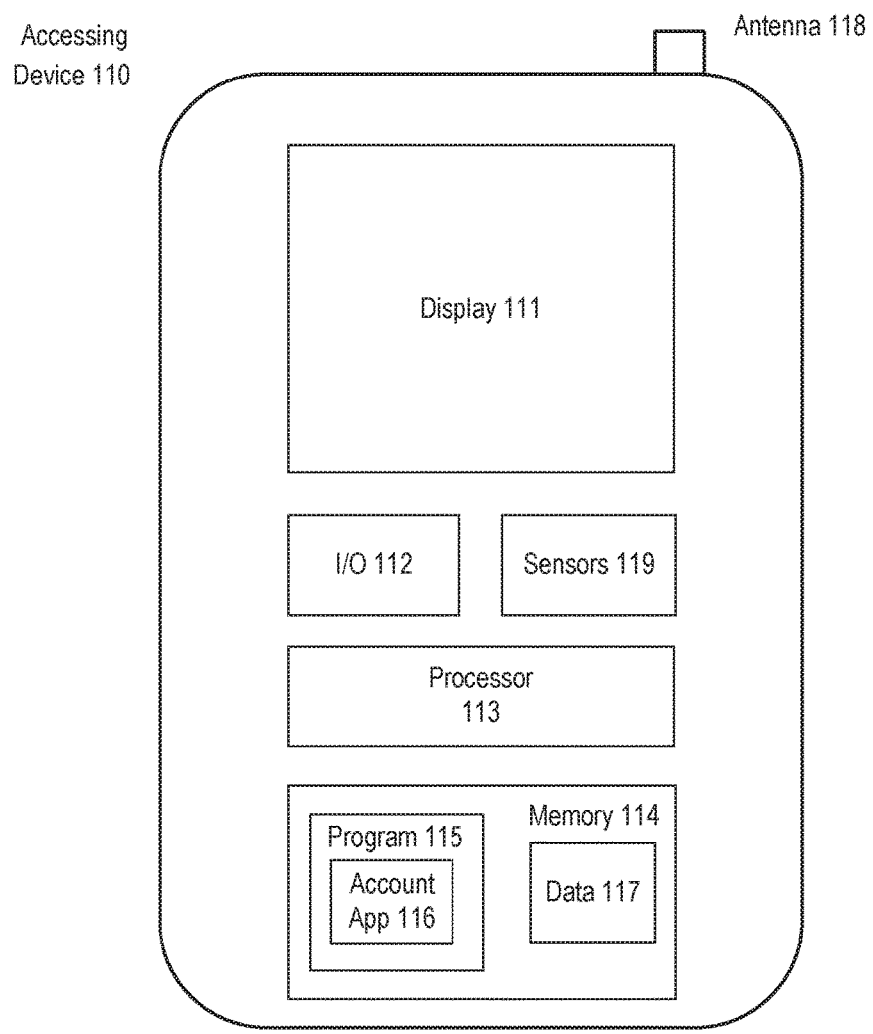
FIG. 2 is a diagram of an exemplary user device, consistent with disclosed embodiments.

FIG. 2 illustrates an exemplary configuration of accessing device 110, consistent with disclosed embodiments. Various types of accessing device 110, such as a cell phone, a tablet, a mobile computer, a desktop, etc. may be implemented in system 100. As shown, accessing device 110 includes a display 111, an input/output ("I/O") device 112, one or more processors 113, and a memory 114 having stored therein one or more program applications 115, such as an account app 116, and data 117. Accessing device 110 also includes an antenna 118 and one or more sensors 119. Display 111, I/O devices 112, processor(s) 113, memory 114, antenna 118, or sensor(s) 119 may be connected to one or more of the other devices depicted in FIG. 1B. Such connections may be accomplished using a bus or other interconnecting device(s).

Processor 113 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 113 may constitute a single core or multiple core processors that executes parallel processes simultaneously. For example, processor 113 may be a single core processor configured with virtual processing technologies. In certain embodiments, processor 113 may use logical processors to simultaneously execute and control multiple processes. Processor 113 may implement virtual machine technologies, or other known technologies to provide the ability to execute, control, run, manipulate, store, etc., multiple software processes, applications, programs, etc. In another embodiment, processor 113 may include a multiple-core processor arrangement (e.g., dual, quad core, etc.) configured to provide parallel processing functionalities to allow smart device 110 to execute multiple processes simultaneously. One of ordinary skill in the art would understand that other types of processor arrangements could be implemented that provide for the capabilities disclosed herein.

I/O devices 112 may include one or more devices that allow accessing device 110 to receive input from a user and provide feedback to the user. I/O devices 112 may include, for example, one or more buttons, switches, speakers, microphones, stylus, or touchscreen panels. In some embodiments, I/O devices 112 may be manipulated by the user to input information into accessing device 110.

Memory 114 may be a volatile or non-volatile, magnetic, semiconductor, tape, optical, removable, non-removable, or other type of storage device or tangible (i.e., non-transitory) computer-readable medium that stores one or more program applications 115 such as account app 116, and data 117. Data 117 may include, for example, customer personal information, account information, and display settings and preferences. In some embodiments, account information may include items such as, for example, an alphanumeric account number, account label, account balance, account issuance date, account expiration date, account issuer identification, a government ID number, a room number, a room passcode, and any other necessary information associated with a user and/or an account associated with a user, depending on the needs of the user, entities associated with network 120, and/or entities associated with system 100.

Program applications 115 may include operating systems (not shown) that perform known operating system functions when executed by one or more processors. By way of example, the operating systems may include Microsoft Windows™, Unix™, Linux™ Apple™, or Android™ operating systems, Personal Digital Assistant (PDA) type operating systems, such as Microsoft CE™, or other types of operating systems. Accordingly, disclosed embodiments may operate and function with computer systems running any type of operating system. Accessing device 110 may also include communication software that, when executed by processor 113, provides communications with network 120, such as Web browser software, tablet, or smart hand held device networking software, etc. Accessing device 110 may be a device that executes applications for performing operations consistent with disclosed embodiments, such as a tablet, mobile device, laptop, desktop, or smart wearable device.

Program applications 115 may include account app 116, such as an account app for activating, setting up, and configuring user access to network 120 and account provider system 130. In some embodiments, account app 116 may include instructions that cause processor 111 to connect with network 120 and account provider system 130.

Accessing device 110 may also store in memory 114 data 117 relevant to the examples described herein for system 100. One such example is the storage of user identifying information like a username/password, user biometric data, etc. or passive device 110 information like browser type, software version, connection type, etc., obtained from sensors 119. Data 117 may contain any data discussed above relating to the historical data used to teach the artificial neural network model or analyzed input. The data 117 may be further associated with information for a particular user or particular user device.

Sensors 119 may include one or more devices capable of sensing the environment around accessing device 110, and/or movement of accessing device 110, and even sensing data gathered by input/output 112. In some embodiments, sensors 119 may include, for example, an accelerometer, a shock sensor, a gyroscope, a position sensor, a microphone, a camera, an ambient light sensor, a temperature sensor, and/or a conductivity sensor. In addition, sensors 119 may include devices for detecting location via systems such as a Global Positioning System (GPS) sensor, a radio frequency triangulation system based on cellular or other such wireless communication, and/or other systems for determining the location of accessing device 110.

Antenna 118 may include one or more devices capable of communicating with network 120. One such example of wireless communication is an antenna wirelessly communicating with network 120 via cellular data or Wi-Fi. Although communication between accessing device 110 and network 120 is shown as wireless communication, communication could also occur using wired communication via, for example, an Ethernet terminal (not shown).

In certain embodiments, device 110 may include a power supply, such as a battery (not shown), configured to provide electrical power to accessing device 110.

Returning to FIG. 1, network 120 may comprise any type of computer networking arrangement used to exchange data. For example, network 120 may be the Internet, a private data network, virtual private network using a public network, and/or other suitable connection(s) that enables system 100 to send and receive information between the components of system 100. Network 120 may also include a public switched telephone network ("PSTN") and/or a wireless network such as a cellular network, WiFi network, or other known wireless network capable of bidirectional data transmission. Network 120 may also comprise any local computer networking used to exchange data in a localized area, such as WiFi, Bluetooth™, Ethernet, Radio Frequency, and other suitable network connections that enable components of system 100 to interact with one another.

Figure 3:
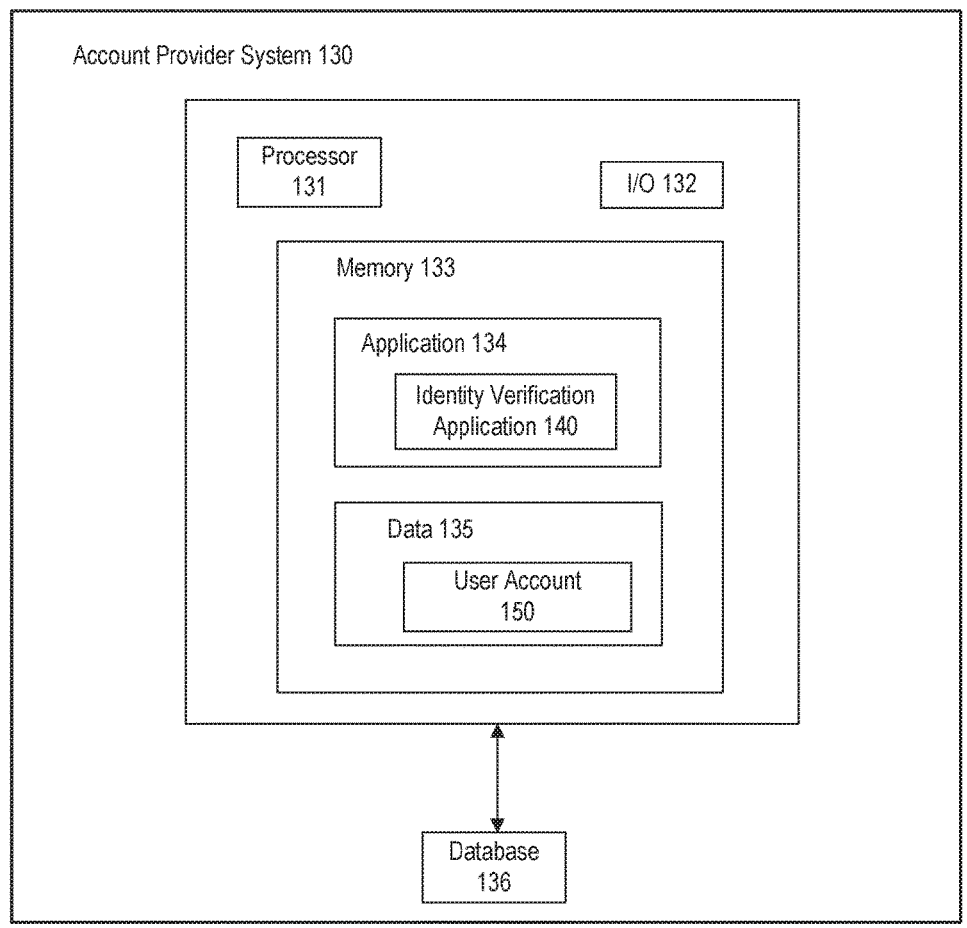
FIG. 3 is a diagram of an exemplary account provider system, consistent with disclosed embodiments.

FIG. 3 shows an exemplary configuration of account provider system 130 consistent with disclosed embodiments. It will be further apparent that account provider system 130 can be further associated with a financial service provider, a merchant, a vendor, or any other entity that maintains a user account 150 (FIG. 1). In one embodiment, account provider system 130 may optionally include one or more processors 131, one or more input/output (I/O) devices 132, and one or more memories 133. In some embodiments, system 130 may take the form of a server, general purpose computer, mainframe computer, or the like. In some embodiments, system 130 may take the form of a mobile computing device such as a smartphone, tablet, laptop computer, or the like. Alternatively, system 130 may be configured as a particular apparatus, device, dedicated circuit, or the like, based on the storage, execution, and/or implementation of the software instructions that perform one or more operations consistent with the disclosed embodiments.

Processor(s) 131 may include one or more known processing devices, such as mobile device microprocessors, desktop microprocessors, server microprocessors, or the like. The disclosed embodiments are not limited to a particular type of processor.

I/O devices 132 may be one or more devices configured to allow data to be received and/or transmitted by system 130. I/O devices 132 may include one or more digital and/or analog devices that allow system 130 to communicate with other machines, devices, and systems, such as other components and devices of system 100. For example, I/O devices 132 may include a screen for displaying messages to a user (such as a customer, a retail venue manager, or a financial service provider employee). I/O devices 132 may also include one or more digital and/or analog devices that allow a user to interact with system 100, such as a touch-sensitive area, keyboard, buttons, or microphones. I/O devices 132 may also include other components known in the art for interacting with a user. I/O devices 132 may also include one or more hardware/software components for communicating with other components of system 100. For example, I/O devices 132 may include a wired network adapter, a wireless network adapter, a cellular network adapter, or the like. Such network components enable device 130 to communicate with other devices of system 100 to send and receive data.

Memory 133 may include one or more storage devices configured to store instructions usable by processor 131 to perform functions related to the disclosed embodiments. For example, memory 133 may be configured with one or more software instructions, such as one or more program applications 134 that perform one or more operations when executed by processor 131. The disclosed embodiments are not limited to separate programs or computers configured to perform dedicated tasks. For example, memory 133 may include a single program or multiple programs that perform the functions of accessing device 110 or network 120. Memory 133 may also store data 135 that is used by the one or more applications 134.

Figure 5:
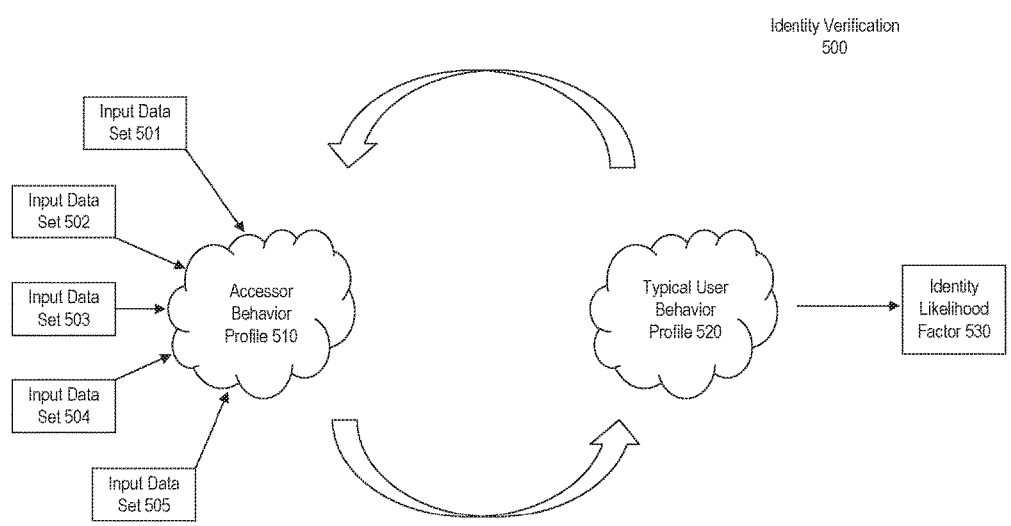
FIG. 5 is a diagram of an exemplary process for modeling and analyzing an accessor profile and a user profile.
Figure 6:
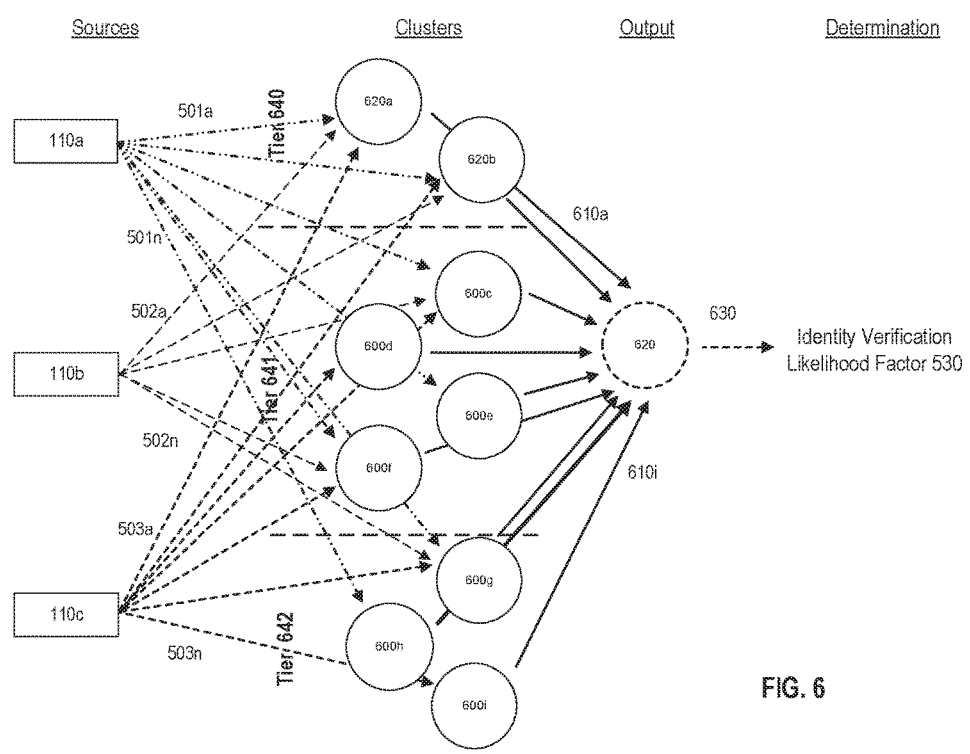
FIG. 6 is a diagram of an exemplarily process for modeling, consistent with disclosed embodiments.
Figure 7:
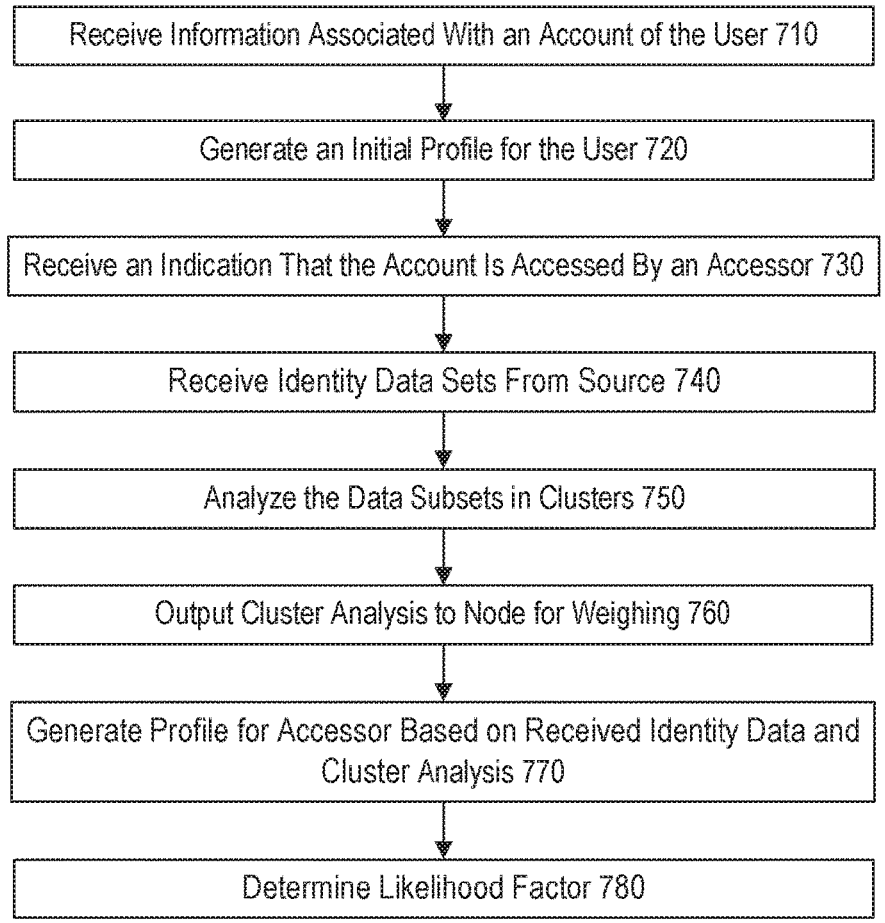
FIG. 7 is a flowchart of an exemplary process for utilizing enhanced data to verify the identity of an accessor.

In certain embodiments, memory 133 may store software executable by processor 131 to perform methods, such as the methods represented by the flowcharts depicted in FIGS. 5-7 and/or the methods associated with user interface (e.g., display 111) discussed above with reference to FIG. 2. In one example, memory 133 may store program applications 134. Applications 134 stored in memory 133, and executed by processor 131, may include a financial service app that causes processor 131 to execute processes related to financial services provided to users including, but not limited to, processing credit and debit card transactions, checking transactions, processing payments for goods, price checking goods, analyzing customer purchasing behavior and adjusting good pricing based on the analysis, adjusting good pricing, authorizing identity of user, verifying transactions, and/or updating the user account. Memory 133 may store identity verification application 140. In some examples, program applications 134 may be stored in an external storage device, such as a cloud server located outside of network 120, and processor 131 may retrieve and execute the externally stored programs 134.

Account provider system 130 may be used to store data 135 relevant to examples described herein for system 100. One such example is the storage of input data received by accessing device 110 from input/output devices 112 (microphones, keyboards, touch screens, cameras, web cameras, mouse, biometric sensors, location based sensors, accelerometers, etc. discussed throughout here). Data 135 may contain any data discussed above relating to the communication of user-based inputs. In addition, data 135 may contain user account 150 data such as previous accessor behavioral patterns, biometric data, account data, typing pattern, mouse movements, finger pressure rates, reading rates, typing error rates, portions of account previously accessed, type of device accessing user account, and/or the accessing device static information. The data 135 associated with particular user may also contain associated information for accessing device 110. Data 135 may also include a modeled determination and analysis.

Account provider system 130 may include at least one database 136. Database 136 may be a volatile or non-volatile, magnetic, semiconductor, tape, optical, removable, nonremovable, or other type of storage device or tangible (i.e., non-transitory) computer readable medium. For example, database 136 may include at least one of a hard drive, a flash drive, a memory, a Compact Disc (CD), a Digital Video Disc (DVD), or a Blu-Ray™ disc.

Database 136 may store data, such as data 135 that may be used by processor 131 for performing methods and processes associated with disclosed examples. Data stored in database 136 may include any suitable data, such as information relating to a user, a mobile accessing device 110, information relating to accessor behavior, and information modeled in the identity verification application 140, and/or user account 150. Although shown as a separate unit in FIG. 3, it is understood that database 136 may be part of memory 133, or an external storage device located outside of system 100. At least one of memory 133, and/or database 136 may store data and instructions used to perform one or more features of the disclosed examples. At least one of memory 133, and/or database 136 may also include any combination of one or more databases controlled by memory controller devices (e.g., server(s), etc.) or software, such as document management systems, Microsoft SQL databases, Share Point databases, Oracle™ databases, Sybase™ databases, or other relational databases. Account provider system 130 may also be communicatively connected to one or more remote memory devices (e.g., databases (not shown)) through network 120, or a different network. The remote memory devices may be configured to store information and may be accessed and/or managed by system 100. Systems and methods consistent with disclosed examples, however, are not limited to separate databases or even to the use of a database.

The components of account provider system 130 may be implemented as a device in hardware, software, or a combination of both hardware and software, as will be apparent to those skilled in the art. For example, although one or more components of system 130 may be implemented as computer processing instructions, all or a portion of the functionality of system 130 may be implemented instead in dedicated electronics hardware.

Account provider system 130 also store identity verification application 140 and user account 150. Through processor(s) 131, account provider system 130 runs identity verification application 140 by performing methods and processes associated with disclosed examples described more fully below. Identity verification application 140 may analyze received data 135 for users and accessing devices including, but not limited to, username/password and previous accessor behavioral patterns associated with the user account 150; biometric, account, typing pattern, mouse movement, finger pressure rate, or typing error rate data associated with the user; portions of user account 150 previously accessed; the accessing device 110 static information like type of device, device operating system, device serial number, type of connection; data obtained from sensors 119 or location based data; historical data stored in memory 114 (and/or memory 133); as well as any analysis conducted or modeled by identity verification application 140. In some examples, identity verification application 140 may be stored in an external storage device, such as a cloud server located outside of network 120 and account provider system 130, and processor 131 may execute the identity verification application 140 remotely.

User account 150 is a subset of account provider system 130 and is analyzed by identity verification application 140. User account 150 may be stored locally in memory 133, or it may be stored in an external storage device, such as a cloud server located outside of network 120, and processor 131 may configure the user account 150 remotely. Data 135 is further associated with multiple users and each respective user has a user account 150 that contains their associated financial service account, their data, and the analysis of identity verification application 140.

Figure 4:
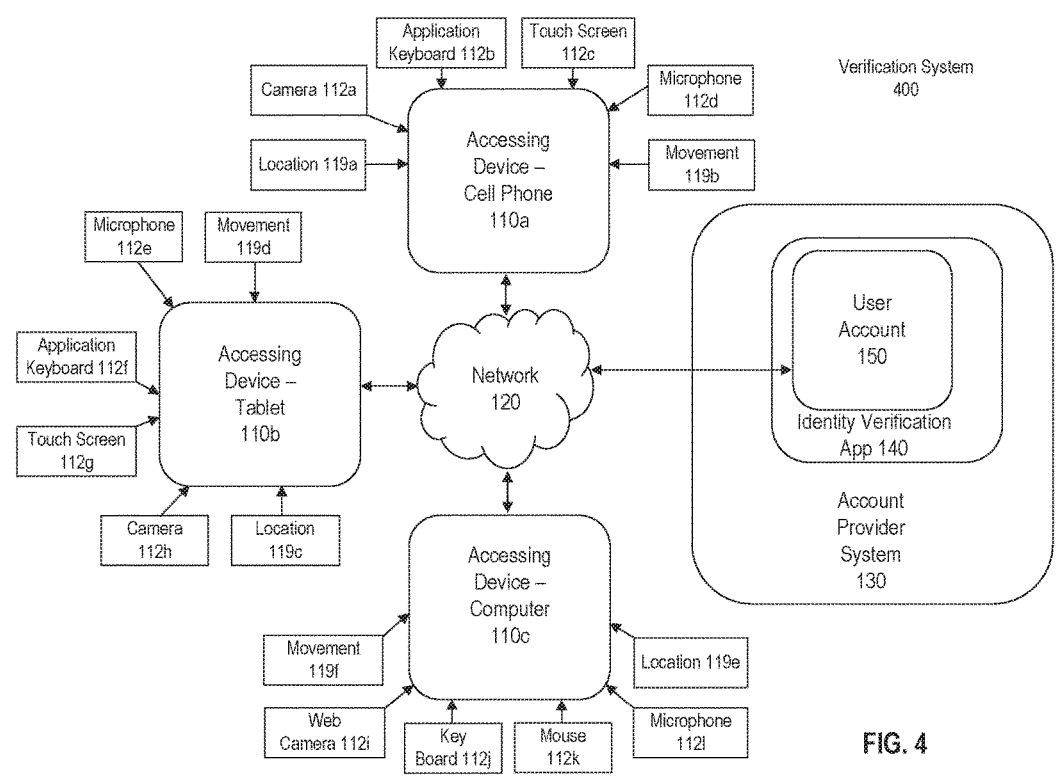
FIG. 4 is a diagram of an exemplary verification system, consistent with disclosed embodiments

FIG. 4 illustrates an exemplary verification 400 system. An accessor attempting to access user account 150 may attempt to access the account through any accessing device 110. Verification system 400 demonstrates several examples of accessing devices such as a cell phone 110a, a tablet 110b, and a desktop computer 110c. Each device 110a-110c may access user account 150 through means discussed throughout here, and even through network 120. Additionally, each device 110a-110c receives input from input/output devices 112a-112l and sensors 119a-119f. Communication between devices 110a-110c and account provider system 130 may occur through various means through network 120. Appropriate forms of communication include near-field communication (NFC), Wi-Fi, Bluetooth, cellular, and/or other such forms of wireless communication, as well as wired communication, discussed herein. In certain embodiments, devices 110a-110c may include a power supply, such as a battery, configured to provide electrical power to one or more components of devices 110a-110c, such as processer 113, a memory 114, and a communication device 118.

Once received, account provider system 130 may further analyze data from 112a-112l and 119a-119f using identity verification application 140. Identity verification application 140 may verify and grant accessors' access to user account 150 from devices 110a-110c. Additionally, devices 110a-c may continuously transmit data from 112a-112l and 119a-119f to account provider system 130, and identity verification application 140 may continuously update its analysis based on this data.

A person of ordinary skill will now understand that the data received by devices 110a-110c from 112a-112l and 119a-119f can be altered, using various combinations, and that the system is not limited to the devices illustrated in FIG. 4. For instance, desktop 110c may be further equipped with a touch screen 112 input/output device as well. Alternatively, cell phone 110a may be further equipped with an accelerometer 119 sensor to detect accessor's acceleration in any given three-axis.

FIG. 5 is a flow chart of an exemplary process verifying accessor/user identity by modeling and analyzing an accessor profile and a user profile. This exemplary process may be utilized by identity verification application 140, by collecting data from users, accessors, and accessing devices 110. The process begins by collecting input at steps 501-505 from a user, from accessors, and from accessing devices 110a-110n (not shown). The input includes, but not limited to, username/password and previous accessor behavioral patterns associated with the user account 150; biometric, account, typing pattern, mouse movement, finger pressure rate, or typing error rate data associated with the user; portions of user account 150 previously accessed; the accessing device 110 static information such as type of device, device operating system, device serial number, type of connection; and data obtained from sensors 119 or location based data; historical data stored in memory 114 (and/or memory 133). Additionally, the input may further include any analysis previously conducted or modeled by identity verification application 140. As discussed above, accessing devices 110a-110n and account provider system 130 store active and passive data associated with accessors and the user collected by multiple devices 110a-110n from numerous user account 150 access attempts. Each step, 501-305, is in real time and continuous, and may be associated with a particular accessor or accessing device 110.

Next, at step 510, identity verification 500 process creates an accessor profile based on accessor behavior as defined by received input data sets 501-505. Step 510 is performed in real time and continuously receives data from devices 110a-110n. Then at step 520, identity verification 500 process compares the accessor profile from step 510 with a user profile reflecting historical behavior typical of a specific user. The comparison at step 520, between the accessor profile and user profile, is also performed in real time and continuously updating.

At step 530, identity verification process 500 analyzes the received data from steps 501-505 to verify that the accessors' identity matches the user associated with user account 150 and the user profile from step 520. The result of this analysis may be in the form of a likelihood factor based on the comparison at step 520 between the accessor profile and the user profile. Further, identity verification process 500 may employ various machine learning techniques to analyze the collected data from steps 501-505. Examples of machine learning techniques include decision tree learning, association rule learning, artificial neural networks, inductive logic programming, support vector machines, clustering, Bayesian networking, reinforcement learning, representation learning, similarity and metric learning, spare dictionary learning, rule-based machine learning, etc.

A person of ordinary skill will now understand that through these verification steps, process 500 further facilitates the goal providing a more seamless and secure account access experience. By utilizing accessor passive and active data sets, and machine learning, identify verification process 500 may further assist the service provider and user by eliminating the need for time consuming and burdensome multi-stage verification procedures. The analytics can determine accurate identities without impeding user's access to the content of their user account 150.

FIG. 6 illustrates an exemplary accessor profile analysis modeling process. Like FIG. 5, this exemplary accessor profile analysis modeling process may be utilized by identity verification application 140, by collecting data from users, accessors, and accessing devices 110. Where FIG. 5 depicts a generic modeling process, FIG. 6 illustrates the more specific computation element based, i.e. node/cluster, artificial neural network as discussed above. Upon determination that an accessor is attempting to access user account 150, system 100 will begin analyzing the received input no matter whether it is passive or active data. For instance, system 100 may receive input data from accessing device 110a (cell phone), device 110b (tablet), or device 110c (desktop computer). Each accessing device 110a-110c may have its own set of input data 501, i.e. 501a-501n, 502a-502n, and 503a-503n. Each device 110a-110c may access user account 150 through means discussed throughout here, and even through network 120. For example, referencing FIG. 4, cell phone accessing device 110a may output data associated with its touch screen 112c or microphone 112d; while tablet accessing device 110b may output data associated with its application keyboard 112f or camera 112h; and desktop computer device 110c may output data associated with its web camera 112i or keyboard 112j. One skilled in the art will understand that the various output combinations for devices 110a-110c and their respective input/output devices 112a-112n or sensors 119a-119n can vary.

Returning now to FIG. 6, received input data sets 501, 502, and 503 may be further sub-categorized by data type character traits and analyzed by clusters 600a-600i. For instance, passive device data for all devices 110a-110c, such as the browser type, operating software version, connection type, model number, processor chip types, memory types, etc. may be collected by cluster 600a. Cluster 600b may collect all data from devices 110a-110c pertaining to entered usernames and/or passwords. Cluster 600c may gather and analyze typing patterns from devices 110a-110c. Cluster 600d may receive and analyze mouse movement data; while cluster 600e may receive and analyze finger pressure data. Cluster 600f may receive and analyze accessor overall error rate data. Additionally, cluster 600g may receive data indicating the portions of user account 150 with which the accessor interacts. Cluster 600h may receive and analyze biometric data from devices 110a-110c; and cluster 600i may receive data indicative of the accessor's text reading rate.

Once again, it should be understood that while FIG. 6 depicts certain combinations of datasets 501a-501n, 502a-502n, and 503a-503n, the invention is not limited to this depiction. For instance, although desktop computer 110c may be the only device with a video camera able to analyze eye movement, and hence the only dataset analyzed by cluster 600i for determining accessor reading rate, it should be further understood that cell phone device 110a may also be equipped with a camera capable of outputting a data subset to be analyzed by cluster 600i. Similarly, desktop computer device 110c may not be the only device outputting mouse movement data to be analyzed by cluster 600f (i.e. a tablet may have a mouse attached to it).

Additionally, datasets from devices 110a-110c may be further weighted based upon iterative analysis, similar to steps 510 and 520 from FIG. 5. For instance, it may be determined that user account 150 is typically accessed by a particular cell phone device 110a, thus the received data subsets from 110a (i.e. 501a-501n) will be weighted heavily compared to other devices. And the clusters themselves could be further grouped into tiers based on the importance and weight of their respective analysis. For instance, successful access to user account 150 from certain devices with passive info, i.e. cluster 600a, may be grouped together with devices commonly entering the most accurate username/password combinations from cluster 600b. In one embodiment, clusters 600a-600b containing passive device data may be grouped together to form a first tier 640. While clusters 600c-600f, generally analyzing the accessor active data may be grouped in a second tier 641. And accessor passive data, generally clusters 600g-600i may also be grouped into a third tier 642.

The collection, and subsequent analysis, occurs in real time, contemporaneously, and continuously while the accessor accesses (and attempts to access) user account 150.

Once separated and categorized, the data subsets may be analyzed together in their respective clusters 600a-600i. As already addressed, depending on the received and categorized data subsets, the clusters may analyze information from multiple accessing devices 110, from multiple input/output 112 devices, and/or by multiple sensors 119; and the cluster analysis itself may be further separated into tiers. Clusters, with techniques generally discussed above described in the artificial machine learning section, will form connections between data subsets and output an analysis 610a-610i to a final node 620. Further, the clusters 600a-600i and node 620 may be program constructs designed to interact with, or be a part of, identity verification application 140.

Node 620, much like the clusters, will collect cluster analysis 610a-610i from each cluster with pre-determined weights and tier scales. Each individual cluster and/or tier of cluster output analysis 610a-610i may carry a unique weighted multiply factor. For instance, as depicted in FIG. 6, node 620 may weight outputs from clusters 600a, 600b, and 600h (i.e. 610a-device passive information, 610b-username/password data, and 610h-biometric data) more heavily in its analysis than the other cluster analyses. Like the cluster weighting, it will be understood by a person skilled in this art that this depiction of assigned weights may be adjusted. In general, the analyzed data subsets are outputted by the clusters to the node 620 for final weighting, compilation, and analysis. The node 620 analysis will continuously receive cluster outputs 610a-610i and analyze the outputs based on pre-established weighted factors and interconnectivity associations between the clusters and/or tiers of clusters.

Finally, the node 620 will output its analysis 630. Node 620 will determine the similarity of the current accessor behavior, derived from the passive and/or active data from the accessing device 110 and from the accessor itself (i.e. 501a-503n), and compare the current accessor behavior against past stored historical data. The stored historical data may consist of previous accessor behavior and user behavior. The accumulation of this similarity comparison analysis 630 will be the quantified identity verification likelihood factor 530.

It will be further understood that the pre-determined factors, such as the likelihood factor 530 threshold, the cluster and node weights, the device weights, the tier weights, and tier combinations may be adjusted before analysis or continuously and contemporaneously during the analysis.

FIG. 7 is a flowchart of an exemplary process embodiment for utilizing, analyzing, and modeling information collected for enhanced verification of accessors' data and attempted access of user account 150. The system begins at step 710, where account provider system 130 receives initial information from a user to be associated with user account 150. As previously discussed, user account 150 may be set up and maintained by a financial service provider or any entity that provides user accounts for their customers. As such, account provider system 130 receives initial account information required, such as financial records, user preferences, contact information, etc., as well as, information to verify user identity, such as for example username/password, known user devices, biometric data, security questions, etc.

The information received by account provider system 130 in step 710 may be received via network 120 from device 110. Alternatively, in step 710, the account provider system 130 may receive the initial information associated with an account of the user through other means, such as, from a database of another entity (e.g., a credit bureau), or from another storage device connected to network 120. In addition, at step 710, the account provider system 130 may receive active and passive data, much like the acquired data sets from steps 501-505 from FIG. 5, from the user and user accessing device 110.

At step 720, account provider system 130 generates an initial, that is, a user profile for the user. This initial profile will be based on accessing behavior of the user. Much like steps 501-505 from FIG. 5, step 720 will collect and utilize active and passive data from the initial user interaction from step 710. This collection of active and passive data may even occur while the user creates user account 150. In step 710, the active and passive data will include data collected from the user's accessing device, such as, username/password; biometric, account, typing pattern, mouse movement, finger pressure rate, or typing error rate data associated with the user; portions of user account 150 previously accessed; the accessing device 110 static information like type of device, device operating system, device serial number, type of connection; data obtained from sensors 119 or location based data; as well as, historical data stored in memory 114.

After receiving information associated with an account of the user at step 710, and after generating the user profile at step 720, the system 100 further receives, at step 730, an indication that the user account 150 is accessed by an accessor. In one embodiment, the account provider system 130 may receive an indication of an user account 150 access attempt by accessing device 110. Alternatively, account provider system 130 may receive an indication, from a remote source, that an accessor is attempting to log into user account 150. At step 730, it is unverified whether accessor is indeed the user.

At step 740, the system 100 further processes received identity data sets from the source associated with the attempted access indicated at step 730. Step 740 may be conducted by account service provider 130 which receives the identity data sets through network 120 from a plurality of accessing devices 110a-110n. In addition, step 740 occurs in real time and continuously while the accessor accesses (and attempts to access) user account 150. Alternatively, step 740 may occur contemporaneously for several devices 110a-n, several input/output devices 112, and/or several sensors 119. Step 740 receives identity data sets from multiple sources and accessing devices 110a-110n and, like step 710, the data sets may be active or passive information from the accessor and accessor device.

At step 750, the received identity data sets are separated into subsets and the subsets are analyzed by clusters. Much like the steps described in FIG. 6, the received identity data may first be categorized. The data may be separated by type of data from a particular accessing device 110, by a type of input/output 112 device, and/or by a sensor 119. The data may be further separated by active and/or passive acquisition techniques. Once separated and categorized, the data subsets may be analyzed together in clusters. Depending on the received and categorized data subsets, the clusters may analyze information from multiple accessing device 110 sources, from multiple input/output 112 devices, and/or by multiple sensors 119. The cluster analysis itself may be further separated into tiers. Each individual cluster and/or tier of clusters may carry a unique weighted multiply factor. Additionally, the received data subsets may also carry unique weighted multiply factors as well. The step 750 analysis will continuously receive and analyze the data subsets based on pre-established weighted factors and interconnectivity associations between clusters. Further, the clusters may be program constructs designed to interact with, or be a part of, identity verification application 140.

At step 760, the analyzed data subsets are outputted by the clusters to a node for final weighting, compilation, and analysis. Much like step 750, the node analysis itself may be further separated into tiers. Each individual node and/or tier of nodes may analyze output clusters and assign unique weighted multiply factors. The step 760 analysis will continuously receive cluster outputs, and analyze the outputs based on pre-established weighted factors and interconnectivity associations between the clusters and/or tiers of nodes. Further, the node and/or tiers of nodes may be program constructs designed to interact with, or be a part of, identity verification application 140.

At step 770, a second, or accessor, profile reflecting accessor behavior is generated based on the received data from step 740, cluster analysis from step 750, and node weighting from step 760. This accessor profile will be based on the accessor's accessing behavior. Much like steps 501-505 from FIG. 5, and step 720, step 770 generate the accessor profile based on the collected active and passive data continuously and contemporaneously from step 740. The active and passive data will include data collected from the accessors' accessing device from step 740, such as, username/password; biometric, account, typing pattern, mouse movement, finger pressure rate, or typing error rate data associated with the accessor; portions of user account 150 previously accessed; the accessing device 110 static information like type of device, device operating system, device serial number, type of connection; data obtained from sensors 119 or location based data; as well as, historical data stored in memory 114.

The system 100 then compares the user profile from step 720 and the accessor profile from step 770 and determines a likelihood factor that the two profiles match at step 780. Based on this determined likelihood factor, the account provider system 130 and/or identity verification application 140 may determine that the accessor is indeed the user and authorize the access of user account 150.

In one embodiment, system 100, at step 780, may determine that the user profile and the accessor profile are not identical, but are similar. Further, at step 780, the system 100 will determine the likelihood that the two profiles are similar within a confidence interval. If system 100 determines the two profile similarities are above a pre-determined threshold factor, then account provider system 130 and/or identity verification application 140 may grant access to user account 150. Alternatively, if accessor activity drops the two profile similarities below the pre-determined threshold factor during access of user account 150, permitted access to user account 150 may be terminated.

Figure 8:
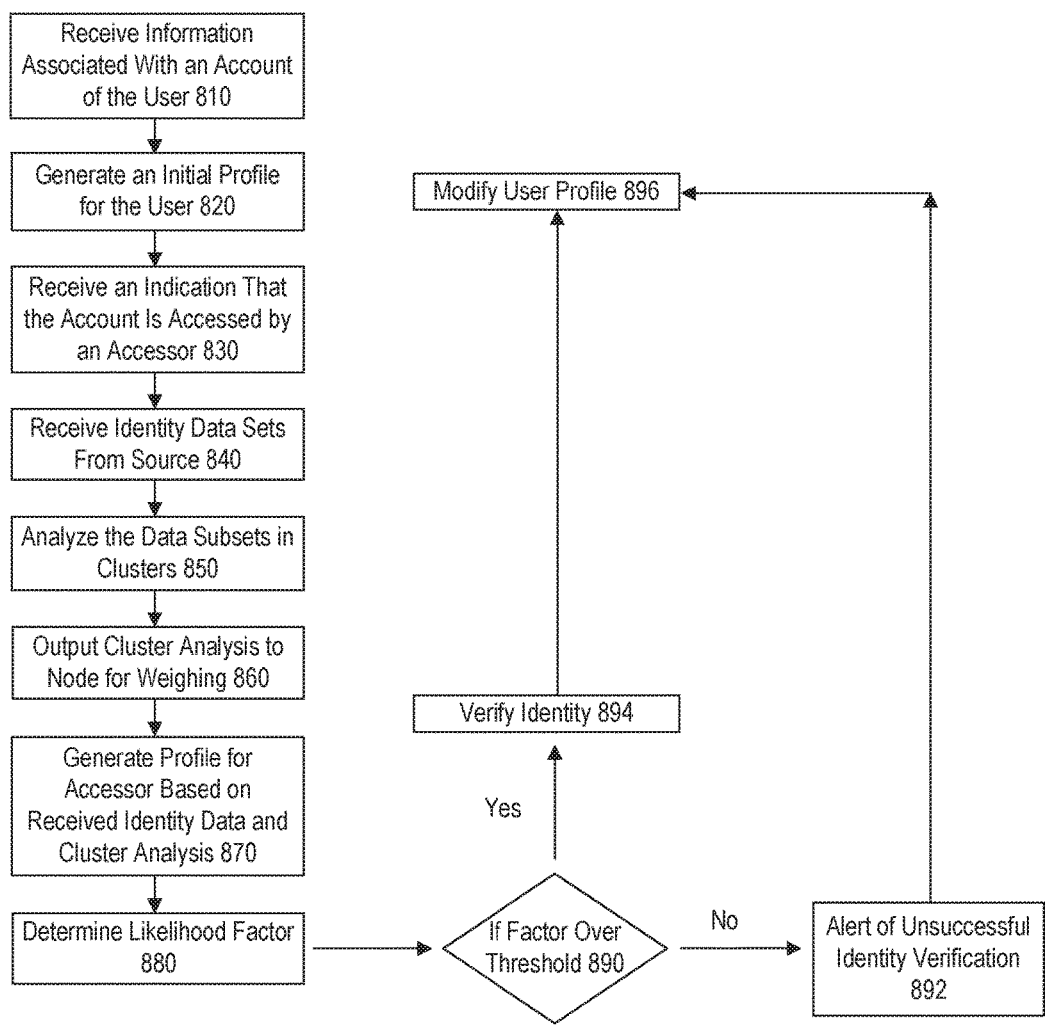
FIG. 8 is a flowchart of another exemplary process for utilizing enhanced data to verify the identity of an accessor.

FIG. 8 is a flowchart of another exemplary process embodiment for utilizing, analyzing, and modeling information collected for enhanced verification of accessors' data and attempted access of user account 150. The system begins at step 810, where user provides initial information associated with their user account 150. As previously discussed, the user account 150 may be associated with a financial service provider or any entity that associates user accounts with their customers. As such, user may provide initial information required by the account provider, such as, financial records, user preferences, contact information, etc., as well as, information to verify user identity. In step 810, user may provide the account provider system 130 with the initial information through network 120 while using device 110. Alternatively, in step 810, the account provider system 130 may receive the initial information associated with an account of the user through other means, such as, from another entity's database, or from another storage device connected to network 120. In addition, at step 810, the account provider system 130 may receive active and passive data, much like the acquired data sets from steps 501-505 from FIG. 5, from the user and user accessing device 110.

At step 820, the account provider system 130 generates an initial, or user, profile for the user. This initial profile will be based on the user accessing behavior. Much like steps 501-505 from FIG. 5, step 820 will collect and utilize active and passive data from the initial user interaction from step 810. The active and passive data will include data collected from the user's accessing device from step 810, such as, username/password; biometric, account, typing pattern, mouse movement, finger pressure rate, or typing error rate data associated with the user; portions of user account 150 previously accessed; the accessing device 110 static information like type of device, device operating system, device serial number, type of connection; data obtained from sensors 119 or location based data; as well as, historical data stored in memory 114.

After receiving information associated with an account of the user at step 810, and after generating an initial profile for the user at step 820, the system 100 further receives, at step 830, an indication that the user account 150 is accessed by an accessor. In one embodiment, the account provider system 130 may receive an indication of an attempted access to user account 150 by accessing device 110. Alternatively, account provider system 130 may receive an indication, from a remote source, that an accessor is attempting to log into user account 150. At step 830, it is unverified whether accessor is indeed the user.

At step 840, the system 100 further processes received identity data sets from the source associated with the attempted access indicated at step 830. Step 840 may be conducted by account service provider 130 which receives the identity data sets through network 120 from a plurality of accessing devices 110a-110n. In addition, step 840 occurs in real time and continuously while the accessor accesses (and attempts to access) user account 150. Alternatively, step 840 may occur contemporaneously for several devices 110a-110n, several input/output devices 112, and/or several sensors 119. Step 840 receives identity data sets from multiple sources and accessing devices 110a-110n and, like step 810, the data sets may be active or passive information from the accessor and accessor device.

At step 850, the received identity data is separated into subsets and the subsets are analyzed by clusters. Much like the steps described in FIG. 7, the received identity data may first be categorized. The data may be separated by type of data from a particular accessing device 110, by a type of input/output 112 device, and/or by a sensor 119. The data may be further separated by active and/or passive acquisition techniques. Once separated and categorized, the data subsets may be analyzed together in clusters. Depending on the received and categorized data subsets, the clusters may analyze information from multiple accessing device 110 sources, from multiple input/output 112 devices, and/or by multiple sensors 119. The cluster analysis itself may be further separated into tiers. Each individual cluster and/or tier of clusters may carry a unique weighted multiply factor. Additionally, the received data subsets may also carry unique weighted multiply factors as well. The step 850 analysis will continuously receive and analyze the data subsets based on pre-established weighted factors and interconnectivity associations between clusters. Further, the clusters may be program constructs designed to interact with, or be a part of, identity verification application 140.

At step 860, the analyzed data subsets are outputted by the clusters to a node for final weighing, compilation, and analysis. Much like step 850, the node analysis itself may be further separated into tiers. Each individual node and/or tier of nodes may analyze output clusters and assign unique weighted multiply factors. The step 860 analysis will continuously receive cluster outputs and analyze the outputs based on pre-established weighted factors and interconnectivity associations between the clusters and/or tiers of nodes. Further, the node and/or tiers of nodes may be program constructs designed to interact with, or be a part of, identity verification application 140.

At step 870, a profile for the accessor is generated based on the received data from step 840, cluster analysis from step 850, and node weighting from step 860. This accessor profile will be based on the accessor's accessing behavior. Much like steps 501-505 from FIG. 5, and step 820, step 870 generate the profile based on the collected active and passive data continuously and contemporaneously from step 840. As described here throughout, the active and passive data will include data collected from the accessors' accessing device from step 840, such as, username/password; biometric, account, typing pattern, mouse movement, finger pressure rate, or typing error rate data associated with the accessor; portions of user account 150 previously accessed; the accessing device 110 static information like type of device, device operating system, device serial number, type of connection; data obtained from sensors 119 or location based data; as well as, historical data stored in memory 114.

The system 100 then compares the initial user profile from step 820 and the accessor profile from step 870 and determines a likelihood factor that the two profiles match at step 880. Based on this determined likelihood factor, the account provider system 130 and/or identity verification application 140 may determine that the accessor is indeed the user and authorize the access of user account 150. In one embodiment, system 100, at step 880, may determine that the initial user profile and the accessor profile are not identical but are similar. Further, at step 880, the system 100 will determine the likelihood that the two profiles are similar within a confidence interval.

At step 890, the system 100 will compare the likelihood factor determined in step 880 against a pre-determined threshold factor. If system 100 determines the two profile similarities are not above the pre-determined threshold factor, then, at step 892, the account provider system 130 and/or identity verification application 140 will alert the user, or the account provider system 130, of an unsuccessful identity verification attempt. Further, the alert from step 892 may be further stored with account provider system 130 for future use and reference. Alternatively, if system 100 determines the two profile similarities are above the pre-determined threshold factor, then, at step 894, the account provider system 100 and/or identity verification application 140 will verify the accessor as the user and grant access to user account 150. If accessor activity drops the two profile similarities below the pre-determined threshold factor during access of user account 150, permitted access to user account 150 may be terminated, and the system 100 may revert back to step 892.

Then at step 896, after either an unsuccessful identity verification from step 892 and/or successful identity verification from step 894, system 100 will modify the initial user profile generated at step 820. Additionally, all the predetermined values may be altered based on step 896 reiterative adjustments. For instance, the pre-determined threshold factor from 890 may be raised or lowered based upon repeated likelihood factor confidence intervals from step 880. And the weighted factors from steps 840-860 may be adjusted based on subsequent determined likelihood factors from step 880 and/or step 890 outcomes. Alternatively, weighted factors from steps 840-860 may be further adjusted from the continuous and contemporaneous received data from step 830 and 840. Additionally, the tiers and cluster sub-categories may be further adjusted as well.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A system for verifying a user identify, comprising:
one or more memory devices storing instructions; and
one or more processors configured to execute the instructions to perform operations comprising:
   receiving information associated with an account of a user;
   generating a first profile, the first profile being related to the user;
   receiving an indication that the account is being accessed by an accessor through an accessor device;
   receiving, from the accessor device, identity data comprising a plurality of data subsets associated with the accessor;
   storing the data subsets in respective clusters, wherein the clusters are nonlinear artificial neural network computational elements;
   generating cluster analyses by analyzing the data subsets in respective clusters;
   outputting the cluster analyses to node instances, wherein the node instances are nonlinear artificial neural network computation elements based on a set of the clusters;
   weighting the cluster analyses outputs in the node instances;
   generating a second profile, the second profile being related to the accessor and being based on the received identity data and weighted cluster analyses; and
   determining a likelihood factor that the accessor is the user based on a comparison of the first and second profiles.

2. The system of claim 1, wherein receiving identity data comprises receiving identity data collected by sensors of the accessor device.

3. The system of claim 2, wherein receiving identity data comprises receiving:
   accessor data comprising at least one of username, password, typing pattern, typing cadence, typing error rate, mouse movement, mouse scrolling rate, mouse clicking rate, mouse clicking error rate, frequency of mouse use, finger pressure, finger error rate, biometrics, or reading rate; and accessor device data comprising at least one of software version, browser type, or connection speed.

4. The system of claim 1, wherein the operations comprise generating rules for weighting different cluster analyses outputs and weighing different identity data from different sources.

5. The system of claim 4, wherein:
the first profile comprises a set of rules; and
the operations comprise analyzing the stored data based on the rules.

6. The system of claim 5, wherein the operations comprise weighting the outputted cluster analysis based on the rules.

7. The system of claim 6, wherein the operations comprise:
grouping the clusters into tiers based on the rules; and
weighting the cluster output analysis based on the tiers.

8. The system of claim 1, wherein receiving information associated with an account of a user includes receiving information from at least one of a mobile device or a tablet device.

9. The system of claim 1, wherein the processor is further configured to confirm that the accessor is the user if the likelihood factor is above a threshold.

10. The system of claim 9, wherein the processor is further configured to modify the user profile with data from the accessor profile if the accessor is confirmed as the user, based on the likelihood factor.

11. The system of claim 10, wherein the processor is further configured to alert the user of unsuccessful identity verification if the accessor is not confirmed as the user.

12. The system of claim 11, wherein the first profile is stored in an account provider database.

13. The system of claim 12, wherein the database comprises records of data set inputs, cluster analysis, and accessor attempts associated with the user account.

14. The system of claim 13, wherein the processor is further configured to modify the user profile with data from the database.

15. The system of claim 14, wherein the processor is further configured to update the database with data from unsuccessful identify verification attempts.

16. The system of claim 11, wherein the processor is further configured to prevent further access to the user account if the accessor is not confirmed as the user.

17. The system of claim 16, wherein the processor is further configured to alert the account provider of unsuccessful identity verification if the accessor is not confirmed as the user.

18. The system of claim 1, wherein the first profile is generated by the user.

19. The system of claim 1, wherein the first profile is imported from an account provider database.

20. The system of claim 1, wherein the processor is further configured to generate a new cluster to receive new data subsets.

* * * * *